ized Patent [19]

United States Patent [19]

McMahan

[11] Patent Number: 4,951,296
[45] Date of Patent: Aug. 21, 1990

[54] LASER ANODE CONSTRUCTION

[75] Inventor: William H. McMahan, Wendover, Nev.

[73] Assignee: McMahan Laser Corporation, Salt Lake City, Utah

[21] Appl. No.: 377,066

[22] Filed: Jul. 10, 1989

[51] Int. Cl.⁵ .............................................. H01S 3/097
[52] U.S. Cl. ........................................ 372/87; 372/88; 372/61
[58] Field of Search ...................... 372/33, 34, 61, 62, 372/63, 87, 88

[56] References Cited

U.S. PATENT DOCUMENTS

| 4,380,078 | 4/1983 | Wang et al. | 372/87 |
| 4,434,493 | 2/1984 | Chaffee | 372/87 |
| 4,631,727 | 12/1986 | Crane et al. | 372/87 |
| 4,656,640 | 4/1987 | Peterson et al. | 377/87 |
| 4,742,527 | 5/1988 | Wiedemann et al. | 372/87 |
| 4,750,182 | 6/1988 | Crane et al. | 372/87 |
| 4,771,435 | 9/1988 | Tobin et al. | 372/88 |
| 4,807,243 | 2/1989 | Riley | 372/87 |
| 4,856,016 | 8/1989 | Kanamoto | 372/87 |

Primary Examiner—William L. Sikes
Assistant Examiner—Robert E. Wise
Attorney, Agent, or Firm—Olive & Olive

[57] ABSTRACT

The anode end of a gas laser is constructed so as to include an electrically and thermally insulating barrier between the Brewster window and the anode end of the tube bore thereby permitting cooler operating temperatures at the Brewster window and confinement of the electric discharge within the anode itself.

3 Claims, 1 Drawing Sheet

LASER ANODE CONSTRUCTION

FIELD OF INVENTION

This invention relates to gas discharge lasers and more specifically to an improved anode construction for a gas discharge laser.

BACKGROUND ART

Anode constructions for gas discharge lasers have taken many forms. Representative prior art constructions believed sufficient for background to the present invention are illustrated in U.S. Pat. Nos. 3,670,262, 3,544,915 and 3,755,756.

A concern in any type of anode construction for a gas discharge laser is that of containing the electrical discharge within the anode without impeding travel of the main discharge through the bore of the tube. The tube may be made up of segments or be in a solid form as shown in the cited prior art. It is also desired that the anode construction be of a form that does not unduly restrict the size of the anode. Thus, the object of the invention becomes that of providing an improved anode construction which permits the main laser discharge to pass unimpeded through the anode while confining the electrical discharge within the anode by means of a dielectric barrier through which the main laser discharge passes. Other objects will be apparent as the description proceeds.

DISCLOSURE OF INVENTION

The anode construction of the invention in the embodiment used for illustration is directed to forming the anode assembly with a cylindrical metal shroud joined to the anode end of the tube within which near one end of the shroud is mounted an internal metal anode member. This anode member has a cylindrical portion mounted within a portion of reduced thickness of the laser tube at its anode end and has an integral cup shape portion at its outer end. A ceramic disc which forms a dielectric discharge barrier is mounted within such cup shape portion and provides an aperture of high electrical impedance through which the main laser gas discharge passes. A header cup mounts within and at the outer end of the shroud and supports as an extension therefrom a tubular, beam confining member on which a Brewster window is mounted.

In operation, the anode operates at a cooler temperature and the Brewster window is subject to less contamination because of the cooler temperature. Either water cooled or air cooled constructions may be employed with the anode construction of the invention.

BEST MODE FOR CARRYING OUT THE INVENTION

Figure 1:
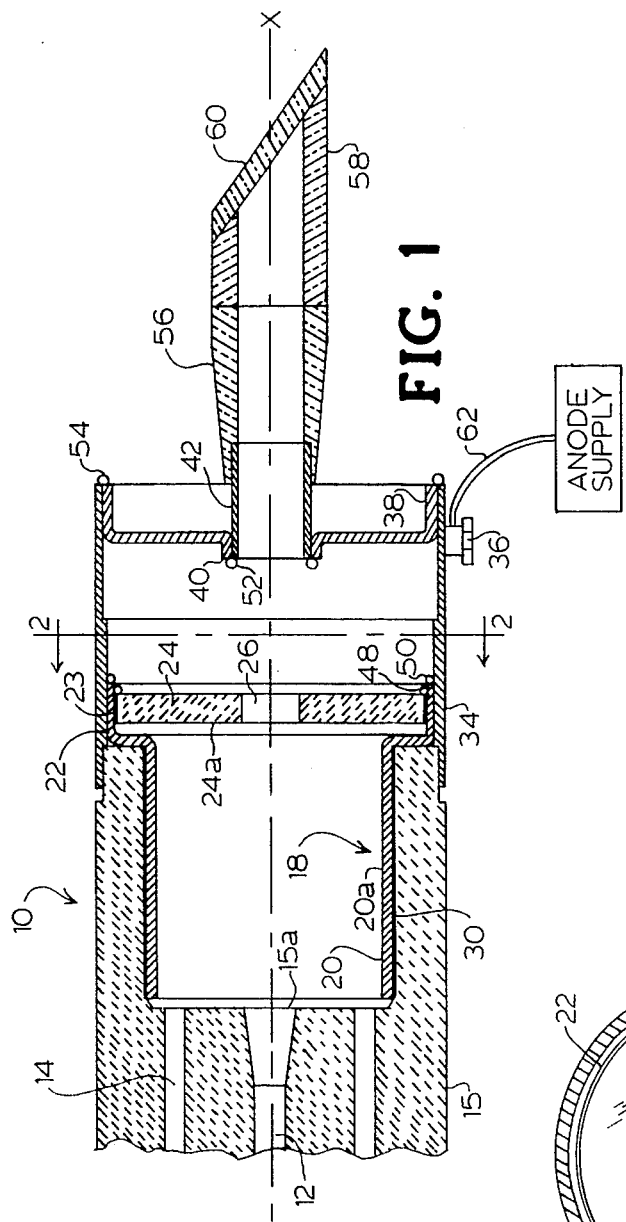
FIG. 1 is a partial section view of a gas discharge laser tube incorporating the improved anode construction of the invention.
Figure 2:
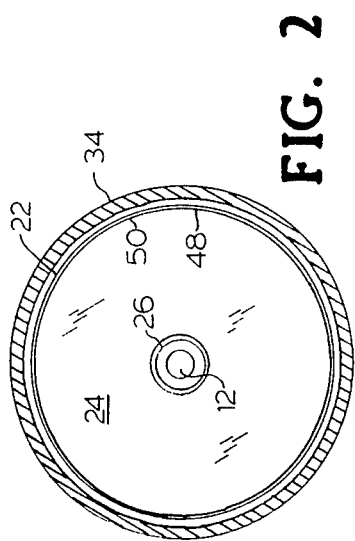
FIG. 2 is an end section view taken along line 2—2 of FIG. 1.

A water jacketed and water cooled argon ion laser formed with a segmented type tube 10 is used by way of example in reference to FIGS. 1 and 2. The water cooling, beam focusing means, vacuum, power supply, mounting, cathode, and housings are eliminated for purpose of illustration in view of the invention being primarily directed to the anode construction only.

Tube 10 is made up of a plurality of hermetically sealed individual segments formed of electrically insulating material providing a central bore 12 and gas return paths 14, the number and size of which will vary with the type laser employing the invention. Segment 15 at the anode end of the tube represents one such segment and is formed with its anode end of reduced thickness to receive a generally cylindrical internal anode member 18 in a snug, nesting relation. Anode member 18 is coaxial with the laser beam axis X—X and provides over a major portion of its length a cylindrical portion 20 which serves as the anode. Integral and coaxial therewith an outwardly extending cylindrical cup portion 22 receives a relatively thin ceramic disc 24 having an aperture 26 through which the main gas laser discharge passes. Disc 24 operates as a dielectric barrier and effectively confines the discharge attachment within the cylindrical portion 20. Anode portion 20 is secured within segment 15 by brazing a thin brazing foil 30 whose thickness is emphasized for illustration in the drawing. An open ended metal shroud 34 is brazed to cup portion 22 by brazing 23 and extends outwardly from cup portion 22 to receive a cup member 38 spaced lengthwise from cup portion 22. Cup member 38 forms part of the vacuum container within the tube 10 and includes an aperture 40 coaxial with the laser beam axis X—X and adapted to receive a tubular Kovar formed mounting member 42. Cup member 38 while preferably formed of metal could be formed of an electrically insulating material. Disc 24 and cup portion 22 are secured by respective alloy rings 48, 50 and mounting member 42 and cup member 38 are secured by Tig welds 52, 54. Beam shroud members 56, 58 formed of glass and secured together provide a metal to glass transition as a portion of the vacuum container and provide support for a hermetically sealed Brewster window 60. While beam shroud members 56, 58 are made as two pieces for convenience it is recognized they could be formed as an integral piece. The anode lead 62 connected to the illustrated anode supply 64 is suitably secured to the shroud member 34 by a suitable clamp 36 as illustrated. Conventional hermetic sealing of the tube elements is employed throughout.

In operation, the anode portion 20 serves to distribute the discharge while at the same time permits the laser beam to form and be transmitted through the aperture 26 of the electrically and heat barrier insulating disc 24. Aperture 26 is formed to have a relatively high electrical impedance and may, for example, be in the range of ⅛ inch to ¼ inch in diameter depending on the size laser to which the invention is adapted. The internal braze provided by brazing foil 30 generates uniform heat dissipation and with disc 24 in place all of the electrical discharge is substantially confined within the space defined by the inner surface 24(a) of disc 24, inner surface 20(a) of anode member 20 and end surface 15(a) of segment 15. Therefore, the opportunity for burnout due to thermal transfer to shroud 34 and header cup member 38 is eliminated. Additionally, the metal/glass transition formed by shroud members 56, 58 as well as the Brewster window 60 are isolated from the discharge. A cooler anode operation results and contamination of the Brewster window 60 is reduced.

While illustrated in conjunction with a gas discharge laser having a tube formed of ceramic segments, it will be appreciated that the invention readily adapts to the solid type laser tube as well. It should also be appreciated that either air or liquid cooling may be employed with a laser tube incorporating the anode construction of the invention. While not illustrated, it may also be noted that the anode member 18, the shroud 34, and the cup member 38 could be formed as a single, integral metal structure. In another form, anode member 18 could be formed as a cylindrical anode without the cup shaped portion 22 and the barrier disc 24 mounted within the outer end of such a cylindrical anode. With any of such variations the anode operates at a cooler temperature and contamination of the Brewster window is accordingly reduced by reason of the invention construction.

What is claimed is:

1. A gas laser construction, comprising:
   (a) a cylindrical gas laser tube formed of electrically insulating material defining a longitudinally extending central bore for transmission of a laser beam, said tube having an anode end with an end wall portion of reduced thickness;
   (b) a cylindrical anode member form of electrically conducting material having over a major portion of its length a first cylindrical portion serviceable as a laser anode and integral therewith a second enlarged cup shaped portion having an outer surface, said first portion of said anode member being snugly nested within said tube end wall portion with said cup shaped portion residing proximate thereto;
   (c) an open ended cylindrical shroud member formed of electrically conducting material having the inner surface of one end thereof secured to the outer surface of said tube end wall cup portion and an outer end extending therefrom;
   (d) a disc member having a central aperture providing an electrical path of high impedance and mounted within said cup shaped portion and formed of a material operative to establish an electrical discharge and heat barrier at the location of said cup shaped portion;
   (e) a cup member having a central aperture and an outer surface portion secured to an inner portion of said outer end of said shroud member and spaced lengthwise from said disc member;
   (f) a tubular structure joined to said cup member at its said central aperture and extending outwardly therefrom, said tubular structure providing an enclosed path for the laser beam and at its outermost end a support for a Brewster window;
   (g) a Brewster window mounted on said support;
   (h) an anode electrical supply connected through an anode lead to said shroud and operative when energized to establish an electrical discharge attached to said anode member; and
   (i) said tube bore, said anode member, said disc and its aperture, said cup member and its aperture and said tubular structure being arranged coaxially with the axis of the laser beam passing therethrough and in conjunction with said Brewster window forms a hermetically sealed space around said beam and during operation of said laser said anode electrical discharge is confined within said anode member and substantially prevented from migrating toward said cup member by the presence of said disc.

2. A gas laser construction, comprising:
   (a) a cylindrical gas laser tube providing a central bore for transmission of a laser beam and having an anode end at an entrance to the bore;
   (b) a cylindrical electrically conducting anode member operatively associated with and having an inner end hermetically sealed to the anode end of the tube with an outer end extending therefrom;
   (c) means for establishing an electrical discharge within said anode member;
   (d) tubular closure means hermetically sealed at one end to the outer end of said anode member and at an opposite end having a first aperture axially aligned with said laser tube bore;
   (e) a tubular structure hermetically sealed and secured to said closure means and enclosing a path axially aligned with said bore and extending outwardly therefrom for transmission of a laser beam therethrough;
   (f) a Brewster window mounted on an outer end of said tubular structure; and
   (g) a barrier member located between said bore entrance and said first aperture and having a second aperture of high electrical impedance axially aligned with said bore and formed of a material operative in conjunction with the size of said barrier member second aperture and the location of said barrier member to establish an electrical barrier to said discharge thereby confining attachment of the discharge to the interior of said anode member.

3. A gas laser construction, comprising:
   (a) a cylindrical gas laser tube providing a central bore for transmission of a laser beam and having an anode end at an entrance to the bore;
   (b) a cylindrical electrically conducting anode member operatively associated with and having an inner end hermetically sealed to the anode end of the tube and an outer end extending therefrom;
   (c) means for establishing an electrical discharge within said anode member;
   (d) extension structure hermetically sealed to said tube and forming an outwardly extending hermetically sealed tubular path aligned with the central bore of said tube and a Brewster window support at the outermost end thereof;
   (e) a Brewster window mounted on said support; and
   (f) a barrier member spaced lengthwise from said bore entrance and closing the outer end of said anode member, said barrier member having a central aperture axially aligned with said bore, said central bore providing an electrical path of high impedance and said barrier member being formed of a material operative in conjunction with the size of said barrier aperture and the location of said barrier member to establish an electrical barrier to said discharge thereby confining attachment of the discharge to the interior of said anode member.

* * * * *